UNITED STATES PATENT OFFICE.

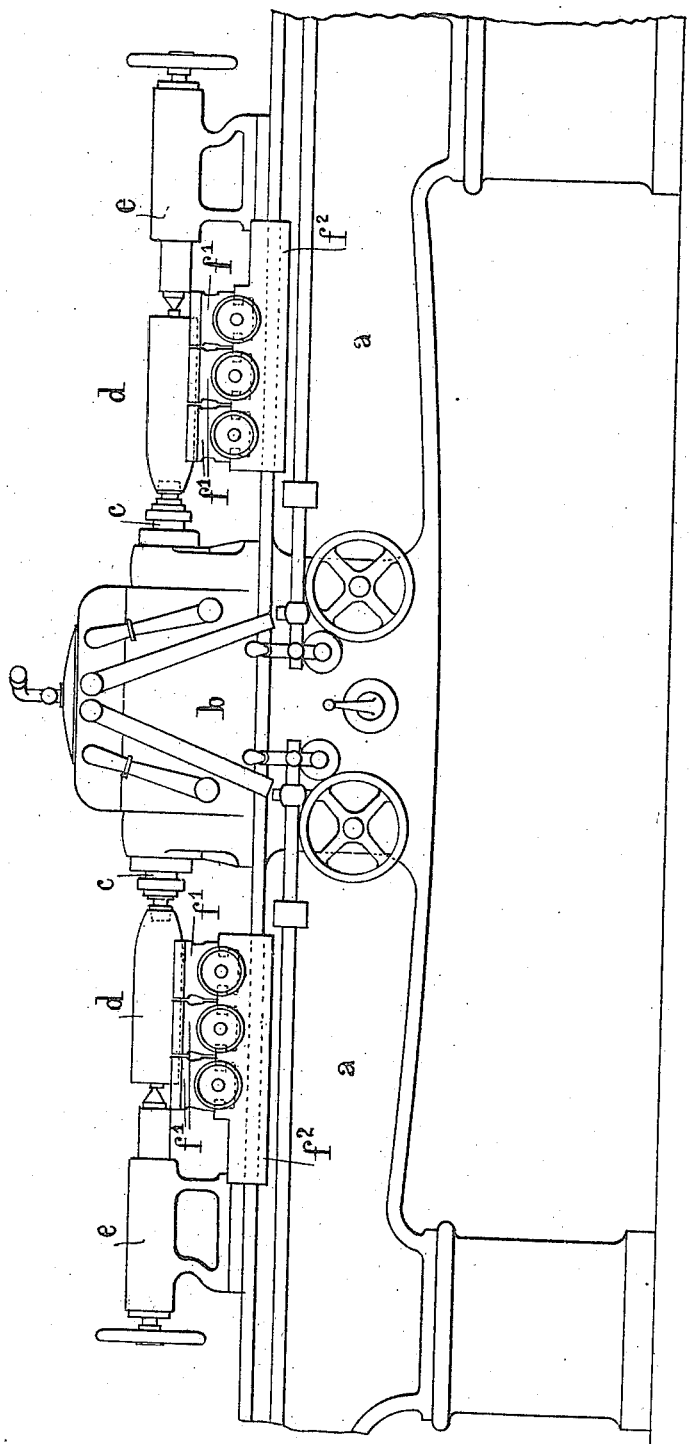

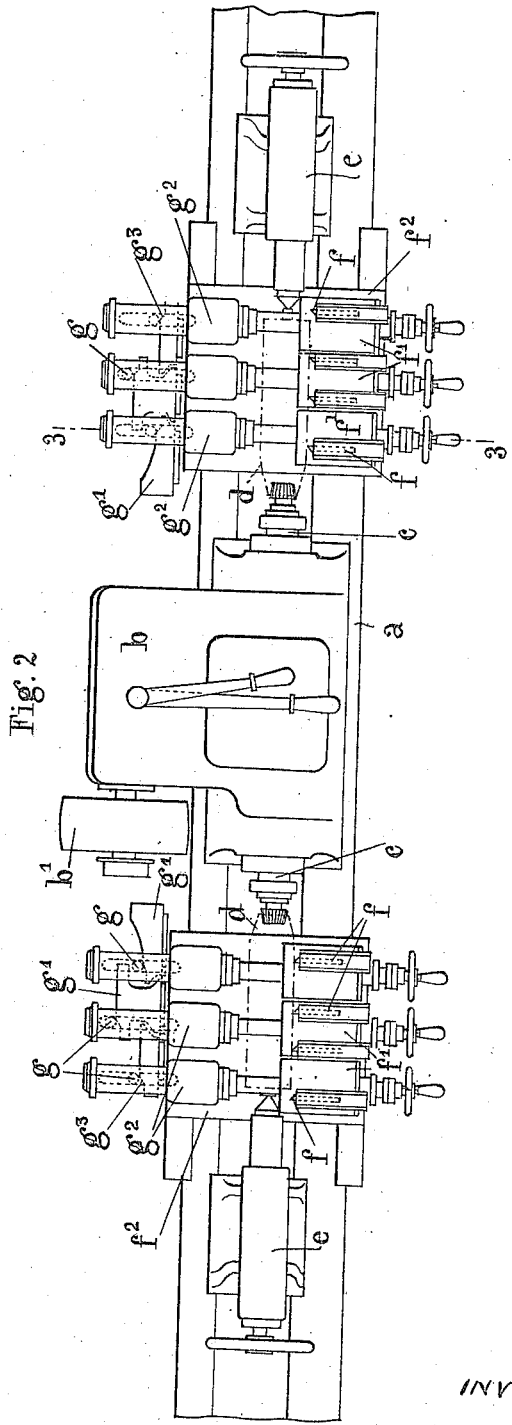

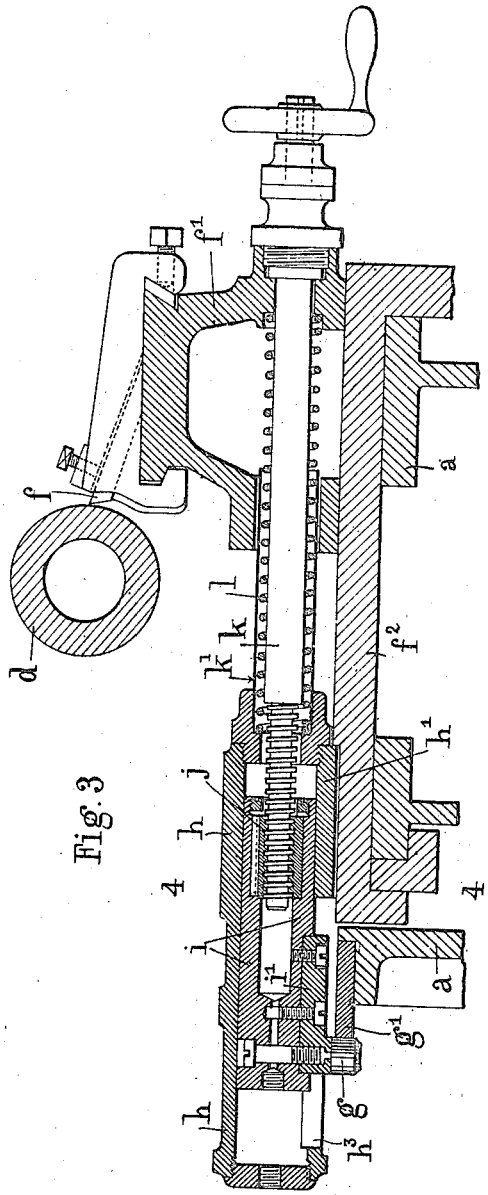
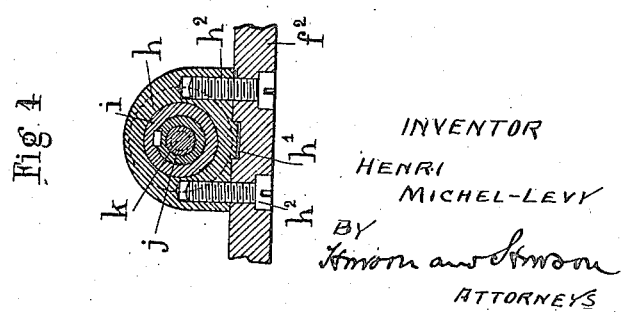

HENRI MICHEL-LÉVY, OF PARIS, FRANCE, ASSIGNOR TO SOCIETÉ ANONYME DES ETABLISSEMENT LEJEUNE & H. MICHEL-LEVY, OF PARIS, FRANCE, A CORPORATION OF FRANCE.

TEMPLET-LATHE.

1,239,422.

Specification of Letters Patent.     Patented Sept. 4, 1917.

Application filed August 9, 1916. Serial No. 113,930.

*To all whom it may concern:*

Be it known that I, HENRI MICHEL-LÉVY, a citizen of the Republic of France, and a resident of 1 Impasse du Moulin-Joly, Paris, France, have invented new and useful Improvements in or Relating to Templet-Lathes, of which the following is a specification.

The present invention relates to templet lathes and my object is to provide such an improved connection between the tool carrier and the templet that the application of the tool to the blank at right angles to the axis of the latter is assured, and those strains avoided which might cause the tool slide to bind during its travel on the lathe bed.

In the accompanying drawings,

Figures 1 and 2 are respectively an elevation and plan of a lathe in which my invention is embodied in one form;

Figs. 3 and 4 are sections on larger scale on the lines 3—3, Fig. 2 and 4—4, Fig. 3.

These drawings illustrate the invention applied by way of example to a duplex lathe for operating simultaneously upon a pair of blanks supported at their adjacent ends by a two-part spindle the opposite ends of which are driven independently through a change speed gear mechanism.

The lathe bed $a$ comprises in its central portion a change speed gear box $b$ which, by means of a set of levers and suitable toothed wheels, renders it possible to drive at different speeds and, if necessary, in different directions, two independent spindles $c\ c$ arranged axially in line in the longitudinal axis of the lathe. Each of the said spindles $c$ is adapted to support at one end the work to be machined, which is supported at the other side by a puppet head $e$. A single driving pulley $b'$ drives the gear in box $b$, and from the latter the work to be machined is driven at the desired speed and in the desired direction. The machining of each of the shells or other work is simultaneously effected by several tools $f$ mounted each on a separate slide rest, or several on one slide rest $f'$. These various slide rests $f'$ are mounted on a longitudinally adjustable main slide $f^2$. Each of the tools $f$ is applied against the surface of the shell $d$ by a guiding slide with roller $g$, traveling on a reproduction templet $g'$ located opposite the tool $f$ relatively to the shell $d$, the said roller carrying with it in its travel the corresponding slide rest $f'$ which is secured to it by a transmission member $g^2$ (Fig. 2). Each of the tools $f$ is thus forced to rough cut or finish a certain portion of the work to be machined. In the drawing, the shell $d$ is shown machined at once by four tools $f$ mounted on three slide rests, at four points dividing its length into approximately equal parts. Each corresponding templet $g'$ insures the desired penetration of the tool into the metal and the shaping of a portion of the shell. Each of the templets $g'$ is provided with an inclined plane $g^3$ enabling the tool gradually to attack the metal at the beginning of its travel. The various templets $g'$ are mounted so as to be staggered in a horizontal plane. At the end of its working travel each of the tools $f$ consequently passes again over the portion of the shell machined by the adjacent tool at the beginning of its travel, so as to avoid any irregularity in the surface of the turned shell.

This arrangement enables a single attendant to supervise simultaneously the machining of two shells or other objects, this work being done very quickly and very accurately owing to the arrangement of multiple tools.

The connection between the guiding slide and the slide rest is effected in the manner shown in Figs. 3 and 4. The guiding slide comprises a hollow cylindrical body $h$ secured to the main slide $f^2$ by a groove and key joint $h'$ and by two tightening bolts $h^2$. In the interior of the said body $h$, placed in line with the axis of the corresponding slide rest $f'$, slides a piston $i$ provided at its lower portion with a key $i'$ which can move longitudinally in a groove $h^3$ of the cylindrical body $h$. This key carries the guide roller $g$ rolling on the edge of the reproduction templet $g'$. In the interior of the piston $i$ is keyed a sleeve $j$ screw-threaded inside, into which is screwed the screw-threaded end of a rod $k$ secured at its other end to the slide rest $f'$. A helical spring $l$ arranged between the rod $k$ and a sheath $k'$, is placed between the slide rest and the guiding slide carrying the roller, and is intended to move the tool $f$ away from the work to be machined when no longer controlled by the guide roller $g$.

When during operation of the lathe, the roller $g$ is subjected to a stress at an angle oblique to the axis of the blank, (as is particularly the case when the nose of the shell is being cut), this stress is decomposed into two component forces at right angles to each other, one directed to apply the tool $f$ against the surface of the blank, and the other directed to displace the tool rest longitudinally. The latter component is transmitted by the roller $g$ to the piston $i$, and by the latter to the cylinder $h$ and by the latter in turn to the main slide $f^2$ which is longitudinally displaceable. This component which has a tendency to force the tool rest laterally in a horizontal plane, is thus absorbed by the slide $f^2$. The only stress transmitted to the tool rest by the roller $g$ through the tie rod $k$ and sleeve $j$, tends to apply the tool against blank; there is consequently no jamming of the tool rest, but the tool $f$ follows readily and faithfully the profile of the templet $g'$.

The connection between the piston $i$ and the tool rest $f'$ through the tie rod $x$ $k$, sleeve $j$ and spring $l$ makes it possible to operate on blanks of different diameter without having to change the templet and to compensate the wear on the tool when and to the extent necessary.

What I claim is:

In a templet lathe, a longitudinally displaceable tool slide, a tool rest transversely slidable thereon, a fixed templet, a guide bearing against the same, a piston carrying said guide, a cylinder moving with the tool slide and in which said piston freely moves transversely of the slide, a tapped block rigid with said piston and a tie rod threaded at one end to engage said block and having at its other end an abutment engaging the tool rest, substantially as and for the purpose set forth.

In testimony whereof I have signed my name to this specification, in the presence of two subscribing witnesses.

HENRI MICHEL-LÉVY.

Witnesses:
CHARLES DONY,
M. DEFEVRIMONT.

Copies of this patent may be obtained for five cents each, by addressing the "Commissioner of Patents, Washington, D. C."